United States Patent
Wang

(10) Patent No.: US 11,456,810 B2
(45) Date of Patent: Sep. 27, 2022

(54) SYNCHRONIZATION DEVICE AND SYNCHRONIZATION METHOD

(71) Applicant: Ufi Space co., Ltd., New Taipei (TW)

(72) Inventor: Yu-Min Wang, Taoyuan (TW)

(73) Assignee: Ufi Space co., Ltd., New Taipei (TW)

( * ) Notice: Subject to any disclaimer, the term of this patent is extended or adjusted under 35 U.S.C. 154(b) by 25 days.

(21) Appl. No.: 17/090,894

(22) Filed: Nov. 6, 2020

(65) Prior Publication Data

US 2022/0103278 A1 Mar. 31, 2022

(30) Foreign Application Priority Data

Sep. 30, 2020 (TW) ................. 109134039

(51) Int. Cl.
*H04J 3/08* (2006.01)
*H04J 3/06* (2006.01)
*G06F 1/14* (2006.01)

(52) U.S. Cl.
CPC .............. *H04J 3/0667* (2013.01); *G06F 1/14* (2013.01); *H04J 3/0682* (2013.01); *H04J 3/0697* (2013.01)

(58) Field of Classification Search
CPC ...... H04J 3/0667; H04J 3/0697; H04J 3/0658; H04J 3/0638; H04J 3/0641
See application file for complete search history.

(56) References Cited

U.S. PATENT DOCUMENTS

| | | | | |
|---|---|---|---|---|
| 9,369,270 B1* | 6/2016 | Spijker | ................. | H04J 3/0641 |
| 11,088,819 B1* | 8/2021 | Sarda | ................... | H04L 7/0037 |
| 2012/0020245 A1* | 1/2012 | Moeller | ................. | H04L 45/60 370/254 |
| 2012/0300859 A1* | 11/2012 | Chapman | .............. | H04J 3/0664 375/257 |
| 2015/0071309 A1* | 3/2015 | Aweya | .................. | H04J 3/0664 370/503 |

(Continued)

FOREIGN PATENT DOCUMENTS

| | | |
|---|---|---|
| CN | 101146109 | 6/2013 |
| CN | 106921456 | 6/2018 |

OTHER PUBLICATIONS

NETTIMELOGIC, "Introduction to PTP PTP Basics", Mar. 14, 2018, Available at: https://www.nettimelogic.com/resources/PTP%20Basics.pdf.

(Continued)

*Primary Examiner* — Atique Ahmed
(74) *Attorney, Agent, or Firm* — JCIPRNET

(57) ABSTRACT

A synchronization device and a synchronization method for synchronizing a first node and a second node are provided. The first node supports a first time protocol profile, and the second node supports a second time protocol profile. The synchronization method includes: providing a system operating time by a counter; communicating with the first node based on the first time protocol profile to obtain first synchronization information; calculating a time delay according to the first synchronization information, and correcting the system operating time according to the time delay to generate a corrected system operating time; and communicating with the second node based on the second time protocol profile so as to provide the second node with second synchronization information according to the corrected system operating time.

9 Claims, 4 Drawing Sheets

(56) References Cited

U.S. PATENT DOCUMENTS

| | | | | |
|---|---|---|---|---|
| 2015/0257024 A1* | 9/2015 | Baid | ............. | H04W 24/08 |
| | | | | 370/338 |
| 2017/0176953 A1* | 6/2017 | Ogawa | ............. | G04R 20/02 |
| 2019/0319729 A1* | 10/2019 | Leong | ............. | H04J 3/0667 |
| 2019/0379475 A1* | 12/2019 | Seethamraju | ......... | H04J 3/0697 |
| 2021/0397211 A1* | 12/2021 | Takahashi | ............. | H03K 21/02 |

OTHER PUBLICATIONS

"Office Action of Taiwan Counterpart Application", dated Aug. 20, 2021, p. 1-p. 7.

* cited by examiner

SYNCHRONIZATION DEVICE AND SYNCHRONIZATION METHOD

CROSS-REFERENCE TO RELATED APPLICATION

This application claims the priority benefit of Taiwan application serial no. 109134039, filed on Sep. 30, 2020. The entirety of the above-mentioned patent application is hereby incorporated by reference herein and made a part of this profile.

BACKGROUND

Technical Field

The disclosure relates to a synchronization device and a synchronization method.

Description of Related Art

The precision time protocol (PTP) defined by IEEE 1588 is a common time synchronization protocol. Different nodes in the network can achieve time synchronization through the precision time protocol (PTP). With the continuous advance of new application scenarios or hardware devices, the precision time protocol (PTP) has also developed several different profiles. For example, the precision time protocol (PTP) may include a default profile, a g.8265.1 profile, a g.8275.1 profile, a g.8275.2 profile, and so on.

When a user wants to add a new hardware device to an existing network, if the time synchronization of the network adopts an older profile (e.g., the default profile or the g.8265.1 profile), the existing technology cannot upgrade the profile adopted by the network to a new profile (e.g., the g.8275.1 profile or the g.8275.2 profile) without changing the hardware or updating the software. Therefore, new hardware devices added to the network must also adopt the older profile. Accordingly, the functions of the new hardware device are restricted.

SUMMARY

The disclosure provides a synchronization device and a synchronization method capable of synchronizing the time of different nodes.

A synchronization device in the disclosure is adapted to synchronize a first node and a second node. The first node supports the first time protocol profile, and the second node supports the second time protocol profile. The synchronization device includes a counter, a first time protocol stack circuit, a servo circuit, and a second time protocol stack circuit. The counter provides a system operating time. The first time protocol stack circuit is coupled to the first node. The first time protocol stack circuit communicates with the first node based on the first time protocol profile to obtain first synchronization information. The servo circuit is coupled to the counter and the first time protocol stack circuit. The servo circuit calculates a time delay according to the first synchronization information and corrects the system operating time according to the time delay to generate a corrected system operating time. The second time protocol stack circuit is coupled to the servo circuit and the second node. The second time protocol stack circuit communicates with the second node based on the second time protocol profile, so as to provide the second node with second synchronization information according to the corrected system operating time.

In an embodiment of the disclosure, the synchronization device further includes a phase-locked loop circuit. The phase-locked loop circuit is coupled to the servo circuit and provides a clock signal. The first time protocol stack circuit communicates with the first node based on the first time protocol profile to obtain third synchronization information. The servo circuit calculates a frequency drift according to the first synchronization information and the third synchronization information, and corrects the clock signal according to the frequency drift to generate a corrected clock signal. The second time protocol stack circuit provides the second node with the second synchronization information according to the corrected clock signal.

In an embodiment of the disclosure, the first synchronization information includes a first timing and a second timing. The synchronization device further includes a first packet filter circuit and a first timestamp fetch circuit. The first packet filter circuit is coupled to the first time protocol stack circuit. The first timestamp fetch circuit is coupled to the first packet filter circuit and the servo circuit. The first time protocol stack circuit receives a first packet from the first node through the first packet filter circuit. The first packet includes the first timing when the first node transmits the first packet. The first timestamp fetch circuit fetches the second timing in response to the first packet filter circuit receiving the first packet at the second timing.

In an embodiment of the disclosure, the first synchronization information further includes a third timing and a fourth timing. The first time protocol stack circuit transmits a second packet corresponding to the first packet to the first node through the first packet filter circuit. The first timestamp fetch circuit fetches the third timing in response to the first packet filter circuit transmitting the second packet at the third timing. The first time protocol stack circuit receives the third packet from the first node through the first packet filter circuit. The third packet includes the fourth timing when the first node receives the second packet.

In an embodiment of the disclosure, the second synchronization information includes a fifth timing and a sixth timing. The synchronization device further includes a second packet filter circuit and a second timestamp fetch circuit. The second packet filter circuit is coupled to the second time protocol stack circuit. The second timestamp fetch circuit is coupled to the second packet filter circuit, the servo circuit, and the counter. The second time protocol stack circuit transmits a fourth packet to the second node through the second packet filter circuit. The second timestamp fetch circuit fetches the fifth timing in response to the second packet filter circuit transmitting the fourth packet at the fifth timing. The fourth packet includes the fifth timing. The sixth timing is the timing when the second node receives the fourth packet.

In an embodiment of the disclosure, the second synchronization information further includes a seventh timing and an eighth timing. The second time protocol stack circuit receives a fifth packet from the second node through the second packet filter circuit. The seventh timing is the timing when the second node transmits the fifth packet. The second timestamp fetch circuit fetches the eighth timing in response to the second packet filter circuit receiving the fifth packet at the eighth timing. The second time protocol stack circuit transmits a sixth packet corresponding to the fifth packet to the second node through the second packet filter circuit. The sixth packet includes the eighth timing.

In an embodiment of the disclosure, the servo circuit calculates a first difference between the second timing and the first timing, calculates a second difference between the fourth timing and the third timing, and calculates an average of the first difference and the second difference to obtain the time delay.

In an embodiment of the disclosure, the servo circuit calculates a third difference between the first difference and the time delay to obtain a clock offset. The servo circuit corrects the system operating time according to the clock offset to generate the corrected system operating time.

In an embodiment of the disclosure, the first time protocol profile corresponds to the first profile of the precision time protocol (PTP), and the second time protocol profile corresponds to the second profile of the precision time protocol (PTP). The first profile is different from the second profile.

The synchronization method of the disclosure is adapted to synchronize a first node and a second node. The first node supports the first time protocol profile, and the second node supports the second time protocol profile. The synchronization method includes: providing a system operating time by a counter; communicating with the first node based on the first time protocol profile to obtain first synchronization information; calculating a time delay according to the first synchronization information, and correcting the system operating time according to the time delay to generate a corrected system operating time; and communicating with the second node based on the second time protocol profile so as to provide the second node with the second synchronization information according to the corrected system operating time.

Based on the above, the synchronization device in the disclosure is capable of synchronizing multiple nodes adopting different time protocol profiles.

DESCRIPTION OF THE EMBODIMENTS

Figure 1:
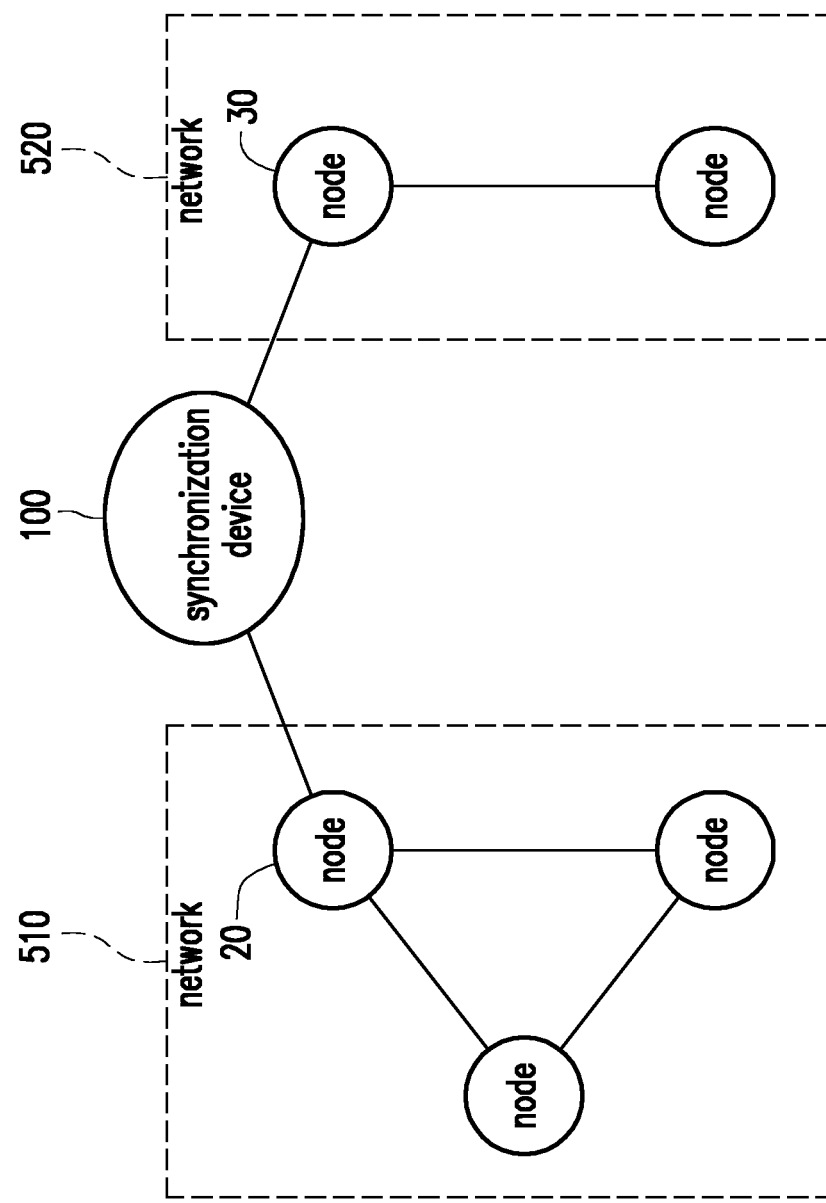
FIG. 1 is a schematic view illustrating networks adopting different time protocol profiles according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments re the same or similar parts.

FIG. 1 is a schematic view illustrating networks adopting different time protocol profiles according to an embodiment of the disclosure. In the embodiment, a network 510 includes multiple nodes (e.g., nodes 20), and all nodes in the network 510 adopt the first time protocol profile. A network 520 includes multiple nodes (e.g., nodes 30), and all nodes in the network 520 adopt the second time protocol profile different from the first time protocol profile. Generally, because the node 20 and the node 30 adopt different time protocol profiles, the node 20 and the node 30 do not achieve the time synchronization. In order to synchronize the node 20 and the node 30 or to synchronize the network 510 and the network 520, the user may dispose a synchronization device 100 in the disclosure between the node 20 and the node 30.

Figure 2:
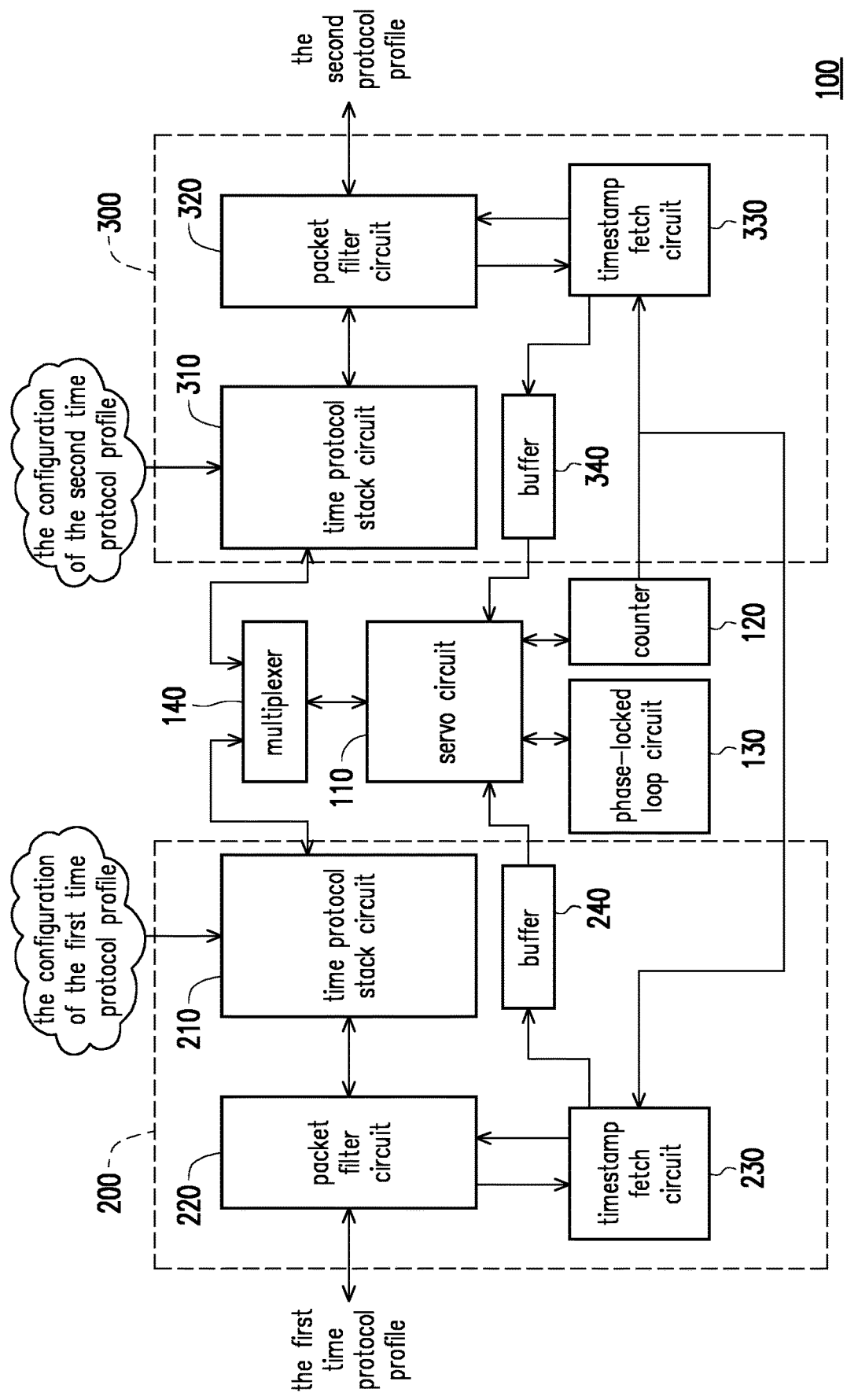
FIG. 2 is a schematic view illustrating a synchronization device according to an embodiment of the disclosure.

FIG. 2 is a schematic view illustrating a synchronization device 100 according to an embodiment of the disclosure. The synchronization device 100 includes multiple circuits. The multiple circuits include a servo circuit 110, a counter 120, a phase-locked loop circuit 130, a multiplexer 140, a slave circuit 200, and a master circuit 300. The slave circuit 200 includes a time protocol stack circuit 210, a packet filter circuit 220, a timestamp fetch circuit 230, and a buffer 240. The master circuit 300 includes a time protocol stack circuit 310, a packet filter circuit 320, a timestamp fetch circuit 330, and a buffer 340. The synchronization device 100 is connected to other nodes through the slave circuit 200 and the master circuit 300. For example, the slave circuit 200 may be connected to the node 20, and the master circuit 300 may be connected to the node 30.

The node 20 supports the first time protocol profile, and the node 30 supports the second time protocol profile. The first time protocol profile is different from the second time protocol profile. In an embodiment, the first time protocol profile and the second time protocol profile may respectively correspond to the first profile and the second profile of the precision time protocol. The first profile or the second profile is, for example, the default profile, the g.8265.1 profile, the g.8275.1 profile, or the g.8275.2 profile, and the disclosure is not limited thereto.

In the embodiment, the synchronization device 100 communicates with the node 20 through the slave circuit 200 to synchronize the time of the synchronization device 100 to be the same as the time of the node 20. The synchronization device 100 communicates with the node 30 through the master circuit 300 to synchronize the time of the node 30 to be the same as the time of the synchronization device 100. Under different usage scenarios, the slave circuit 200 realizes the functions of the master circuit 300, and the master circuit 300 realizes the functions of the slave circuit 200. In an embodiment, the synchronization device 100 communicates with the node 30 through the master circuit 300 to synchronize the time of the synchronization device 100 to be the same as the time of the node 30. The synchronization device 100 communicates with the node 20 through the slave circuit 200 to synchronize the time of the node 20 to be the same as the time of the synchronization device 100.

The servo circuit 110 has computing capabilities. For example, the servo circuit 110 may be implemented as, for example, a central processing unit (CPU), or other programmable general purpose or special purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), or other similar elements.

The counter 120 is adapted to provide the system operating time of the synchronization device 100. The system operating time is, for example, time of day (ToD). The phase-locked loop (PLL) circuit 130 is adapted to provide the clock signal of the synchronization device 100. The counter 120 and the phase-locked loop circuit 130 are coupled to the servo circuit 110.

The time protocol stack circuit 210 is coupled to the servo circuit 110 through the multiplexer 140. The time protocol stack circuit 210 is coupled to the packet filter circuit 220 and communicates with external nodes through the packet filter circuit 220. Specifically, the time protocol stack circuit 210 is connected to the node 20 through the packet filter circuit 220 based on the first time protocol profile to communicate with the node 20 supporting the first time protocol profile.

The timestamp fetch circuit 230 is coupled to the packet filter circuit 220 and the counter 120. When the packet filter circuit 220 transmits or receives a packet, the timestamp fetch circuit 230 is adapted to fetch a timestamp when the packet is transmitted or received. The timestamp fetch circuit 230 is coupled to the servo circuit 110 through the buffer 240 and transmits the fetched timestamp to the servo circuit 110 through the buffer 240. The buffer 240 is, for example, a first in first out (FIFO) buffer.

The time protocol stack circuit 310 is coupled to the servo circuit 110 through the multiplexer 140. The time protocol stack circuit 310 is coupled to the packet filter circuit 320 and communicates with external nodes through the packet filter circuit 320. Specifically, the time protocol stack circuit 310 is connected to the node 30 through the packet filter circuit 320 based on the second time protocol profile to communicate with the node 30 supporting the second time protocol profile.

The timestamp fetch circuit 330 is coupled to the packet filter circuit 320 and the counter 120. When the packet filter circuit 320 transmits or receives a packet, the timestamp fetch circuit 330 is adapted to fetch the timestamp when the packet is transmitted or received. The timestamp fetch circuit 330 is coupled to the servo circuit 110 through the buffer 340 and transmits the fetched timestamp to the servo circuit 110 through the buffer 340. The buffer 340 is, for example, a FIFO buffer.

The time protocol stack circuit 210 obtains the first synchronization information from the node 20. The servo circuit 110 corrects the system operating time in the counter 120 and the clock signal in the phase-locked loop circuit 130 according to the first synchronization information to synchronize the synchronization device 100 and the node 20. The first synchronization information includes timings T1, T2, T3, and T4.

Figure 3:
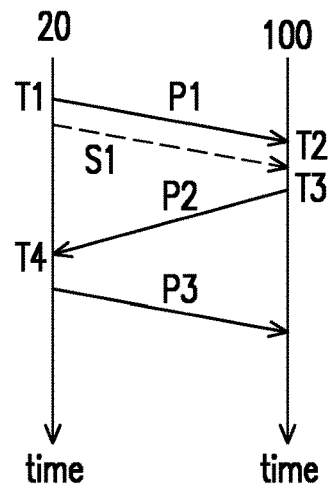
FIG. 3 is a signaling diagram illustrating the obtaining of the first synchronization information according to an embodiment of the disclosure.

Referring to FIG. 3, FIG. 3 is a signaling diagram illustrating the obtaining of the first synchronization information according to an embodiment of the disclosure. The synchronization device 100 obtains the first synchronization information from the node 20. Specifically, the time protocol stack circuit 210 receives a packet P1 from the node 20 through the packet filter circuit 220. The timing T1 is the timing when the node 20 transmits the packet P1 to the synchronization device 100. In an embodiment, the packet P1 includes the relevant information of the timing T1. The time protocol stack circuit 210 obtains the timing T1 from the packet P1. In an embodiment, the node 20 may transmit a packet Si including the relevant information of the timing T1 to the synchronization device 100 after transmitting the packet P1. The time protocol stack circuit 210 receives the packet Si from the node 20 through the packet filter circuit 220. The time protocol stack circuit 210 obtains the timing T1 from the packet Si. The time protocol stack circuit 210 transmits the timing T1 to the servo circuit 110 through the multiplexer 140.

The timing T2 is the timing when the packet filter circuit 220 receives the packet P1. When the packet filter circuit 220 receives the packet P1 at the timing T2, the timestamp fetch circuit 230 fetches the timing T2 in response to the packet P1. The packet filter circuit 220 transmits the timing T2 to the servo circuit 110 through the buffer 240.

After receiving the packet P1, the time protocol stack circuit 210 transmits a packet P2 to the node 20 through the packet filter circuit 220. The timing T3 is the timing when the packet filter circuit 220 transmits the packet P2 to the node 20. When the packet filter circuit 220 transmits the packet P2 to the node 20, the timestamp fetch circuit 230 fetches the timing T3 in response to the packet P2. The packet filter circuit 220 transmits the timing T3 to the servo circuit 110 through the buffer 240.

The timing T4 is the timing when the node 20 receives the packet P2. After the node 20 receives the packet P2, the node 20 transmits a packet P3 to the synchronization device 100. The packet P3 includes the relevant information of the timing T4. The time protocol stack circuit 210 receives the packet P3 from the node 20 through the packet filter circuit 220. The time protocol stack circuit 210 obtains the timing T4 from the packet P3. The time protocol stack circuit 210 transmits the timing T4 to the servo circuit 110 through the multiplexer 140.

After obtaining the first synchronization information corresponding to the node 20 (i.e., the timings T1, T2, T3, and T4), the servo circuit 110 calculates a time delay and a clock offset according to the first synchronization information as shown in equation (1) and equation (2). The DE is the time delay, and the OS is the clock offset. The servo circuit 110 corrects the system operating time provided by the counter 120 according to the clock offset to generate a corrected system operating time.

$$DE=[(T2-T1)+(T4-T3)]/2 \qquad (1)$$

$$OS=(T2-T1)-D=[(T2-T1)-(T4-T3)]/2 \qquad (2)$$

Figure 4:
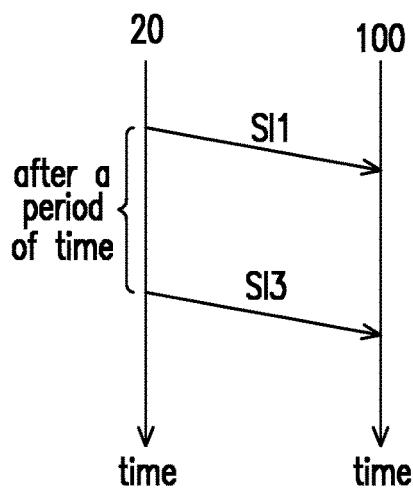
FIG. 4 is a signaling diagram illustrating the obtaining of the first synchronization information and third synchronization information according to an embodiment of the disclosure.

On the other hand, the servo circuit 110 further synchronizes the frequency drift between the synchronization device 100 and the node 20 according to the first synchronization information. Specifically, after the synchronization device 100 obtains the first synchronization information, the synchronization device 100 re-performs the same steps as in FIG. 3 after a period of time to obtain the third synchronization information as shown in FIG. 4. FIG. 4 is a signaling diagram illustrating the obtaining of the first synchronization information and third synchronization information according to an embodiment of the disclosure. SI1 represents the first synchronization information, and SI3 represents the third synchronization information.

The third synchronization information includes timings T1', T2', T3', and T4'. The timings T1', T2', T3', and T4' respectively correspond to the timings T1, T2, T3, and T4 of the first synchronization information. After obtaining the third synchronization information, the servo circuit 110 calculates the frequency drift according to the first synchronization information and the third synchronization information as shown in equation (3). The DI is the frequency drift. The servo circuit 110 corrects the clock signal in the phase-locked loop circuit 130 according to the frequency drift to generate a corrected clock signal.

$$DI = \frac{(T2' - T2) - (T1' - T1)}{(T1' - T1)} \quad (3)$$

After the synchronization device 100 completes the synchronization with the node 20, the counter 120 provides the corrected system operating time, and the phase-locked loop circuit 130 provides the corrected clock signal.

The time protocol stack circuit 310 transmits the second synchronization information to the node 30 according to the corrected system operating time and the corrected clock signal to synchronize the node 30 with the synchronization device 100. In other words, the second synchronization information transmitted from the synchronization device 100 to the node 30 is associated with the corrected system operating time and the corrected clock signal. The second synchronization information includes timings T5, T6, T7, and T8.

Figure 5:
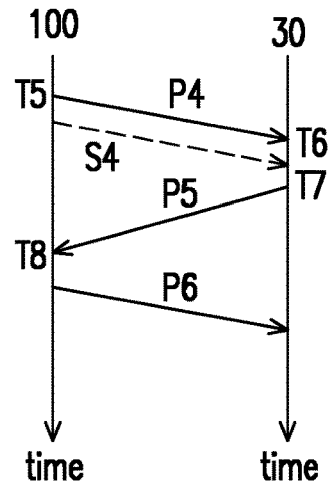
FIG. 5 is a signaling diagram illustrating the providing of the second synchronization information according to an embodiment of the disclosure.

Referring to FIG. 5, FIG. 5 is a signaling diagram illustrating the providing of the second synchronization information according to an embodiment of the disclosure. The synchronization device 100 transmits the second synchronization information to the node 30. Specifically, the time protocol stack circuit 310 transmits a packet P4 to the node 30 through the packet filter circuit 320. The timing T5 is the timing when the packet filter circuit 320 transmits the packet P4 to the node 30. The timestamp fetch circuit 330 fetches the timing T5 and transmits the relevant information of the timing T5 to the time protocol stack circuit 310 in response to the packet filter circuit 320 transmitting the packet P4 to the node 30 at the timing T5. In an embodiment, the packet P4 includes the relevant information of the timing T5. The node 30 obtains the timing T5 from the packet P4. In an embodiment, the time protocol stack circuit 310 transmits a packet S4 including the relevant information of the timing T5 to the node 30 through the packet filter circuit 320 after transmitting a packet P5. The node 30 obtains the timing T5 from the packet S4.

The timing T6 is the timing when the node 30 receives the packet P4. After receiving the packet P4, the node 30 transmits the packet P5 to the synchronization device 100. The timing T7 is the timing when the node 30 transmits the packet P5 to the synchronization device 100. The synchronization device 100 receives the packet P5 through the packet filter circuit 320. The timing T8 is the timing when the packet filter circuit 320 receives the packet P5. The timestamp fetch circuit 330 fetches the timing T8 and transmits the relevant information of the timing T8 to the time protocol stack circuit 310 in response to the packet P5.

After the synchronization device 100 receives the packet P5, the time protocol stack circuit 310 transmits a packet P6 to the node 30 through the packet filter circuit 320. The packet P6 includes the relevant information of the timing T8. The node 30 obtains the timing T8 from the packet P6.

After obtaining the second synchronization information (i.e., the timings T5, T6, T7, and T8), the node 30 corrects its own system operating time and clock signal according to the second synchronization information to achieve the synchronization with the synchronization device 100. After the node 30 completes the synchronization with the synchronization device 100, the node 20, the synchronization device 100, and the node 30 achieve the synchronization.

Figure 6:
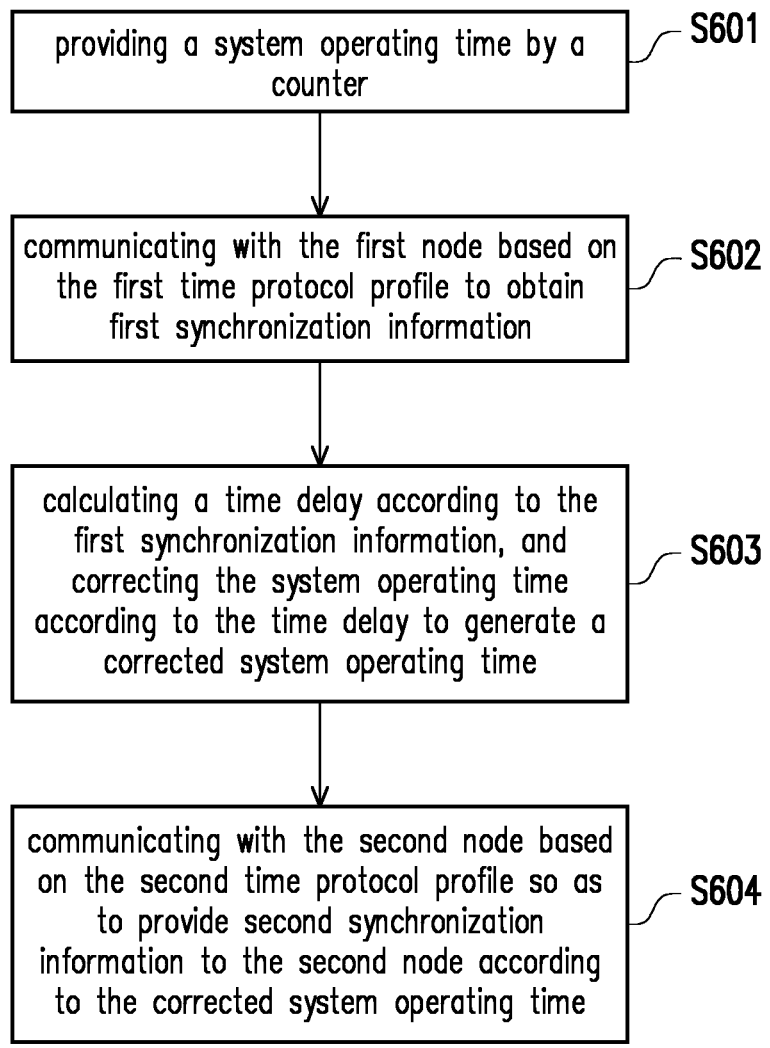
FIG. 6 is a flowchart illustrating a synchronization method according to an embodiment of the disclosure.

FIG. 6 is a flowchart illustrating a synchronization method according to an embodiment of the disclosure. The synchronization method may be implemented by the synchronization device 100 shown in FIG. 2. The synchronization method is adapted to synchronize a first node and a second node. The first node supports the first time protocol profile, and the second node supports the second time protocol profile different from the first time protocol profile. In step S601, the system operating time is provided by the counter. In step S602, the first node is communicated based on the first time protocol profile to obtain the first synchronization information. In step S603, the time delay is calculated according to the first synchronization information, and the system operating time is corrected according to the time delay to generate a corrected system operating time. In step S604, the second node is communicated based on the second time protocol profile to provide the second node with second synchronization information according to the corrected system operating time.

Based on the above, the synchronization device in the disclosure includes two parts: a slave circuit and a master circuit. The slave circuit is adapted to synchronize the synchronization device and the nodes adopting the first time protocol profile. The master circuit is adapted to synchronize the synchronization device and the nodes adopting the second time protocol profile. In this way, the synchronization device achieves the time synchronization among the nodes adopting different time protocol profiles.

What is claimed is:

1. A synchronization device adapted to synchronize a first node and a second node, wherein the first node supports a first time protocol profile, and the second node supports a second time protocol profile, wherein the synchronization device comprises:
   a counter providing a system operating time;
   a phase-locked loop circuit providing a clock signal;
   a first time protocol stack circuit coupled to the first node, wherein the first time protocol stack circuit communicates with the first node based on the first time protocol profile to obtain first synchronization information and second synchronization information;
   a servo circuit coupled to the phase-locked loop circuit, the counter and the first time protocol stack circuit, wherein the servo circuit calculates a time delay according to the first synchronization information and corrects the system operating time according to the time delay to generate a corrected system operating time, wherein the servo circuit calculates a frequency drift according to the first synchronization information and the second synchronization information and corrects the clock signal according to the frequency drift to generate a corrected clock signal;
   a second time protocol stack circuit coupled to the servo circuit and the second node, wherein the second time protocol stack circuit communicates with the second node based on the second time protocol profile, so as to provide the second node with third synchronization information according to the corrected system operating time and the corrected clock signal.

2. The synchronization device according to claim 1, wherein the first synchronization information comprises a first timing and a second timing, wherein the synchronization device further comprises:
   a first packet filter circuit coupled to the first time protocol stack circuit; and
   a first timestamp fetch circuit coupled to the first packet filter circuit and the servo circuit,
   wherein the first time protocol stack circuit receives a first packet from the first node through the first packet filter circuit, wherein the first packet comprises the first timing when the first node transmits the first packet, wherein the first timestamp fetch circuit fetches the second timing in response to the first packet filter circuit receiving the first packet at the second timing.

3. The synchronization device according to claim 2, wherein the first synchronization information further comprises a third timing and a fourth timing,
wherein the first time protocol stack circuit transmits a second packet corresponding to the first packet to the first node through the first packet filter circuit,
wherein the first timestamp fetch circuit fetches the third timing in response to the first packet filter circuit transmitting the second packet at the third timing,
wherein the first time protocol stack circuit receives a third packet from the first node through the first packet filter circuit, wherein the third packet comprises the fourth timing when the first node receives the second packet.

4. The synchronization device according to claim 3, wherein the servo circuit calculates a first difference between the second timing and the first timing, calculates a second difference between the fourth timing and the third timing, and calculates an average of the first difference and the second difference to obtain the time delay.

5. The synchronization device according to claim 4, wherein the servo circuit calculates a third difference between the first difference and the time delay to obtain a clock offset, wherein the servo circuit corrects the system operating time according to the clock offset to generate the corrected system operating time.

6. The synchronization device according to claim 1, wherein the third synchronization information comprises a fifth timing and a sixth timing, wherein the synchronization device further comprises:
a second packet filter circuit coupled to the second time protocol stack circuit; and
a second timestamp fetch circuit coupled to the second packet filter circuit, the servo circuit, and the counter,
wherein the second time protocol stack circuit transmits a fourth packet to the second node through the second packet filter circuit, wherein the second timestamp fetch circuit fetches the fifth timing in response to the second packet filter circuit transmitting the fourth packet at the fifth timing, wherein the fourth packet comprises the fifth timing,
wherein the sixth timing is a timing when the second node receives the fourth packet.

7. The synchronization device according to claim 6, wherein the third synchronization information further comprises a seventh timing and an eighth timing,
wherein the second time protocol stack circuit receives a fifth packet from the second node through the second packet filter circuit, wherein the seventh timing is a timing when the second node transmits the fifth packet,
wherein the second timestamp fetch circuit fetches the eighth timing in response to the second packet filter circuit receiving the fifth packet at the eighth timing,
wherein the second time protocol stack circuit transmits a sixth packet corresponding to the fifth packet to the second node through the second packet filter circuit, wherein the sixth packet comprises the eighth timing.

8. The synchronization device according to claim 1, wherein the first time protocol profile corresponds to a first profile of the precision time protocol (PTP), and the second time protocol profile corresponds to a second profile of the precision time protocol (PTP), wherein the first profile is different from the second profile.

9. A synchronization method adapted to synchronize a first node and a second node, wherein the first node supports a first time protocol profile, and the second node supports a second time protocol profile, wherein the synchronization method comprises:
providing a system operating time by a counter;
providing a clock signal by a phase-locked loop circuit;
communicating with the first node based on the first time protocol profile to obtain first synchronization information and second synchronization information;
calculating a time delay according to the first synchronization information, and correcting the system operating time according to the time delay to generate corrected system operating time;
calculating a frequency drift according to the first synchronization information and the second synchronization information, and correcting the clock signal according to the frequency drift to generate a corrected clock signal; and
communicating with the second node based on the second time protocol profile, so as to provide the second node with third synchronization information according to the corrected system operating time and the corrected clock signal.

* * * * *